United States Patent  
Kishida et al.

(10) Patent No.: US 10,961,859 B2  
(45) Date of Patent: Mar. 30, 2021

(54) SEAL MEMBER ASSEMBLY STRUCTURE AND ASSEMBLY METHOD, SEAL MEMBER, AND GAS TURBINE

(71) Applicant: Mitsubishi Hitachi Power Systems, Ltd., Kanagawa (JP)

(72) Inventors: Hiroaki Kishida, Kanagawa (JP); Norihiko Nagai, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 377 days.

(21) Appl. No.: 15/757,745

(22) PCT Filed: Sep. 1, 2016

(86) PCT No.: PCT/JP2016/075696  
§ 371 (c)(1),  
(2) Date: Mar. 6, 2018

(87) PCT Pub. No.: WO2017/043415  
PCT Pub. Date: Mar. 16, 2017

(65) Prior Publication Data  
US 2018/0347385 A1   Dec. 6, 2018

(30) Foreign Application Priority Data

Sep. 8, 2015  (JP) .............................. JP2015-176770

(51) Int. Cl.  
*F01D 11/00* (2006.01)  
*F02C 7/28* (2006.01)  
(Continued)

(52) U.S. Cl.  
CPC ............ *F01D 11/005* (2013.01); *F01D 9/023* (2013.01); *F02C 3/04* (2013.01); *F02C 7/00* (2013.01);  
(Continued)

(58) Field of Classification Search  
CPC .. F02C 7/28; F01D 9/023; F23R 2900/00012; F23R 3/60  
See application file for complete search history.

(56) References Cited

U.S. PATENT DOCUMENTS 4,679,400 A * 7/1987 Kelm ..................... F23R 3/60  
                                                    415/137  
10,422,244 B2 * 9/2019 Shapiro ................. F01D 11/12  
(Continued)

FOREIGN PATENT DOCUMENTS

CN           1508396       6/2004  
JP            62-176448      11/1987  
(Continued)

OTHER PUBLICATIONS

International Search Report dated Nov. 15, 2016 in International (PCT) Application No. PCT/JP2016/075696, with English translation.  
(Continued)

*Primary Examiner* — Scott J Walthour  
*Assistant Examiner* — Todd N Jordan  
(74) *Attorney, Agent, or Firm* — Wenderoth, Lind & Ponack, L.L.P.

(57) ABSTRACT

A seal member assembly structure and assembly method, a seal member, and a gas turbine, wherein, in a state where first flange parts provided on a combustor transition piece are fitted into first fitting parts provided in seal members, protruding parts provided on the first flange parts are inserted into recessed parts provided in the first fitting parts.

8 Claims, 9 Drawing Sheets

(51) Int. Cl.
*F16J 15/04* (2006.01)
*F02C 7/00* (2006.01)
*F01D 9/02* (2006.01)
*F02C 3/04* (2006.01)

(52) U.S. Cl.
CPC ............... *F02C 7/28* (2013.01); *F16J 15/04* (2013.01); *F05D 2220/32* (2013.01); *F05D 2240/55* (2013.01); *F05D 2260/30* (2013.01)

(56) References Cited

U.S. PATENT DOCUMENTS

| | | | |
|---|---|---|---|
| 10,816,198 B2* | 10/2020 | Fujisawa | F23R 3/46 |
| 2004/0036230 A1 | 2/2004 | Matsuda et al. | |
| 2004/0141838 A1 | 7/2004 | Thompson | |
| 2005/0058537 A1 | 3/2005 | Corman et al. | |
| 2006/0123797 A1 | 6/2006 | Zborovsky et al. | |
| 2008/0010989 A1 | 1/2008 | Kato et al. | |
| 2012/0292860 A1 | 11/2012 | Moehrle et al. | |
| 2016/0194981 A1* | 7/2016 | Drake | F01D 25/246 |
| | | | 60/722 |
| 2016/0273374 A1* | 9/2016 | Mitchell | F01D 9/023 |

FOREIGN PATENT DOCUMENTS

| | | |
|---|---|---|
| JP | 2004-76693 | 3/2004 |
| JP | 2004-169655 | 6/2004 |
| JP | 2004-225698 | 8/2004 |
| JP | 2006-105076 | 4/2006 |
| JP | 2006-284127 | 10/2006 |
| JP | 2012-132461 | 7/2012 |
| JP | 2013-100747 | 5/2013 |
| JP | 5886465 | 3/2016 |

OTHER PUBLICATIONS

Written Opinion of the International Searching Authority dated Nov. 15, 2016 in International (PCT) Application No. PCT/JP2016/075696, with English translation.
Office Action dated Oct. 5, 2015 in Japanese Application No. 2015-176770, with English translation.
Office Action dated Feb. 3, 2020 in corresponding Chinese Patent Application No. 201680051334.9 with English-language translation.
Office Action dated Feb. 3, 2020 in corresponding Japanese Patent Application No. 201680051334.9 with English-language translation.
Extended European Search Report dated Mar. 21, 2019 in European Patent Application No. 16844276.2.

* cited by examiner

SEAL MEMBER ASSEMBLY STRUCTURE AND ASSEMBLY METHOD, SEAL MEMBER, AND GAS TURBINE

TECHNICAL FIELD

The present invention relates to an assembly structure of a seal member provided between a combustor and a turbine for preventing a combustion gas leak, an assembly method for the seal member, a seal member, and a gas turbine to which the seal member assembly structure is applied.

BACKGROUND ART

A typical gas turbine is configured of a compressor, a combustor, and a turbine. Air taken in through an air intake is compressed by the compressor to produce high-temperature, high-pressure compressed air. In the combustor fuel is supplied to the compressed air and then burned to obtain high-temperature, high-pressure combustion gas (operating fluid), and then the combustion gas is used to drive the turbine and a generator linked to the turbine.

In the gas turbine, a plurality of combustors are provided side by side forming a ring shape in a circumferential direction, and each combustor has an upper seal and a lower seal provided between a downstream end of a combustor transition piece and an upstream end of a shroud in a turbine. The combustor is also provided, in a side part of the combustor transition piece, with a side seal for partitioning adjacent combustors from one another. The upper seal and the lower seal, and an upper flange and a lower flange of the combustor transition piece, are fitted together and then linked by a linking pin. Therefore, the combustion gas is prevented from leaking from a gap between the combustor transition piece and the shroud by the upper seal, the lower seal, and each of the side seals.

This type of gas turbine is disclosed in, for example, JP S62-176448A.

SUMMARY OF THE INVENTION

Problem to be Solved by the Invention

As described above, an upper seal and a lower seal, and an upper flange and a lower flange of a combustor transition piece, are fitted together and linked. In this case, shift of the upper seal and the lower seal in a gas turbine axial direction is restrained by these upper seal and lower seal being disposed between the combustor transition piece and the shroud, while shift thereof in a radial direction is restrained by the shroud. Therefore, there is a risk that if it became impossible to restrain shift of the upper seal and the lower seal in a circumferential direction during operation of the gas turbine, the upper seal and the lower seal could be displaced, thus making it impossible to prevent a combustion gas leak.

An object of the present invention is to resolve the problem described above by providing a seal member assembly structure able to prevent displacement of a seal member and thereby a combustion gas leak over a long period of time, a seal member assembly method, a seal member, and a gas turbine.

Means for Solving the Problem

A seal member assembly structure according to the present invention for achieving the object described above is an assembly structure of a seal member provided along a circumferential direction of a gas turbine between a combustor pipe and a turbine shroud, wherein, in a state where a first flange part provided on either the combustor pipe or the turbine shroud is fitted into a first fitting part provided in the seal member, a protruding part provided on either the first flange part or the first fitting part is inserted into a recessed part provided in the other of the two, and the protruding part and the recessed part prevent the first fitting part from moving with respect to the first flange part along the circumferential direction of the gas turbine.

Accordingly, because the first flange part fits into the first fitting part of the seal member, the seal member is linked to the combustor pipe or the turbine shroud, and at the same time the protruding part provided on either the first flange part or the first fitting part is inserted into the recessed part provided in the other of these. Therefore, while the seal member tries to shift in the circumferential direction with respect to the combustor pipe or the turbine shroud, this shift of the seal member is restricted because the protruding part and the recessed part make contact. As a result, because displacement of the seal member is prevented, a combustion gas leak can be prevented over a long period of time, and reliability can be enhanced.

The seal member assembly structure according to the present invention is characterized in that a linking pin penetrates the first flange part and the first fitting part to link the seal member to either the combustor pipe or the turbine shroud.

Accordingly, because the linking pin penetrates the first flange part and the first fitting part and the seal member is linked to either the combustor pipe or the turbine shroud, shift of the seal member can be restricted by the linking pin.

The seal member assembly structure according to the present invention is characterized in that the protruding part protrudes to one side in the radial direction of the gas turbine, and the recessed part is recessed to the one side in the radial direction of the gas turbine.

Accordingly, because the protruding part protruding in the radial direction of the gas turbine fits into the recessed part recessed in the radial direction, the protruding part and the recessed part make contact, and can thus easily restrict shift of the seal member.

The seal member assembly structure according to the present invention is characterized in that the protruding part and the recessed part are provided with a gap along the circumferential direction of the gas turbine.

Accordingly, because a gap is provided along the circumferential direction of the gas turbine between the protruding part and the recessed part, when the combustor pipe and the seal member are to be disassembled, a shear force in the amount of this gap can be applied to break the linking pin, which thus enables enhancement of maintainability.

The seal member assembly structure according to the present invention is characterized in that surfaces of the protruding part and the recessed part that face each other are formed by curved surfaces.

Accordingly, because the protruding part and the recessed part are formed by curved surfaces, wear occurring when the parts make contact can be reduced.

The seal member assembly structure according to the present invention is characterized in that the first flange part fits into the first fitting part such that neither is capable of relative movement in the axial direction of the gas turbine, and in that the linking pin penetrates the first flange part and the first fitting part such that neither is capable of relative movement in the circumferential direction of the gas turbine.

Accordingly, the seal member can be properly positioned with respect to the combustor pipe.

The seal member assembly structure according to the present invention is characterized in that the seal member is provided with a second fitting part, and a second flange part provided on either the combustor pipe or the turbine shroud fits into the second fitting part such that neither is capable of relative movement in the radial direction of the gas turbine.

Accordingly, the seal member can be properly positioned with respect to the turbine shroud.

Furthermore, a seal member assembly method according to the present invention is an assembly method for a seal member provided along a circumferential direction of a gas turbine between a combustor pipe and a turbine shroud, and has the steps of: fitting a first flange part of the combustor pipe into a first fitting part of the seal member; and inserting a protruding part provided on either the first flange part or the first fitting part into a recessed part provided in the other of the two, and using the protruding part and the recessed part to prevent the first fitting part from moving with respect to the first flange part along the circumferential direction of the gas turbine.

Accordingly, the first flange part of the combustor pipe fits into the first fitting part of the seal member, and the protruding part provided on either the first flange part or the first fitting part is inserted into the recessed part provided in the other of these. Therefore, while the seal member tries to shift in the circumferential direction with respect to the combustor pipe or the turbine shroud, this shift of the seal member is restricted because the protruding part and the recessed part make contact. As a result, because displacement of the seal member is prevented, a combustion gas leak can be prevented for a long period of time, and reliability can be enhanced.

The seal member assembly method according to the present invention is characterized in that said method further has a step of securing the first flange part and the first fitting part by a linking pin penetrating therethrough.

Accordingly, because the linking pin penetrates and secures the first flange part and the first fitting part, shift of the seal member can be restricted by the linking pin.

Furthermore, a seal member according to the present invention is provided along a circumferential direction of a gas turbine between a combustor pipe and a turbine shroud, and has a first fitting part into which a first flange part provided on either the combustor pipe or the turbine shroud fits, and a locking part for preventing the first fitting part from moving with respect to the first flange part along the circumferential direction of the gas turbine.

Accordingly, with regard to the seal member, the first flange part provided on either the combustor pipe or the turbine shroud fits into the first fitting part, and the locking part prevents movement of the first fitting part with respect to the first flange part along the circumferential direction. Therefore, while the seal member tries to shift in the circumferential direction with respect to the combustor pipe or the turbine shroud, this shift of the seal member is restricted because the protruding part and the recessed part make contact. As a result, because displacement of the seal member is prevented, a combustion gas leak can be prevented over a long period of time, and reliability can be enhanced.

The seal member according to the present invention is characterized in that said member is provided with a through hole through which a linking pin for linking the first fitting part to the first flange part penetrates.

Accordingly, because the linking pin penetrates the through hole to link the first flange part and the first fitting part, shift of the seal member can be restricted by the linking pin.

The seal member according to the present invention is characterized in that the locking part is either a protruding part or a recessed part that locks in the first flange part.

Accordingly, the structure can be simplified by making the locking part either a protruding part or a recessed part.

Furthermore, a gas turbine according to the present invention is characterized in that said gas turbine is provided with a compressor for compressing air, a combustor for mixing the compressed air compressed by the compressor with a fuel and burning the mixture, a turbine for obtaining rotational force using combustion gas generated by the combustor, and the seal member.

Accordingly, because displacement of the seal member is prevented, a combustion gas leak can be prevented over a long period of time, and reliability can be enhanced.

Effect of the Invention

According to the seal member assembly structure, the seal member assembly method, the seal member, and the gas turbine according to the present invention, because a relationship between a protruding part and a recessed part prevents relative movement between a seal member and a combustor pipe or a turbine shroud, displacement of the seal member is prevented, thus making it possible to prevent a combustion gas leak over a long period of time, and enhance reliability.

DESCRIPTION OF THE PREFERRED EMBODIMENTS

Preferred embodiments of a seal member assembly structure, a seal member assembly method, a seal member, and a gas turbine according to the present invention are described in detail below with reference to the attached drawings. Note that the present invention is not limited by these embodiments, and, when there are a plurality of embodiments, includes embodiments configured by combining said embodiments.

First Embodiment

Figure 6:
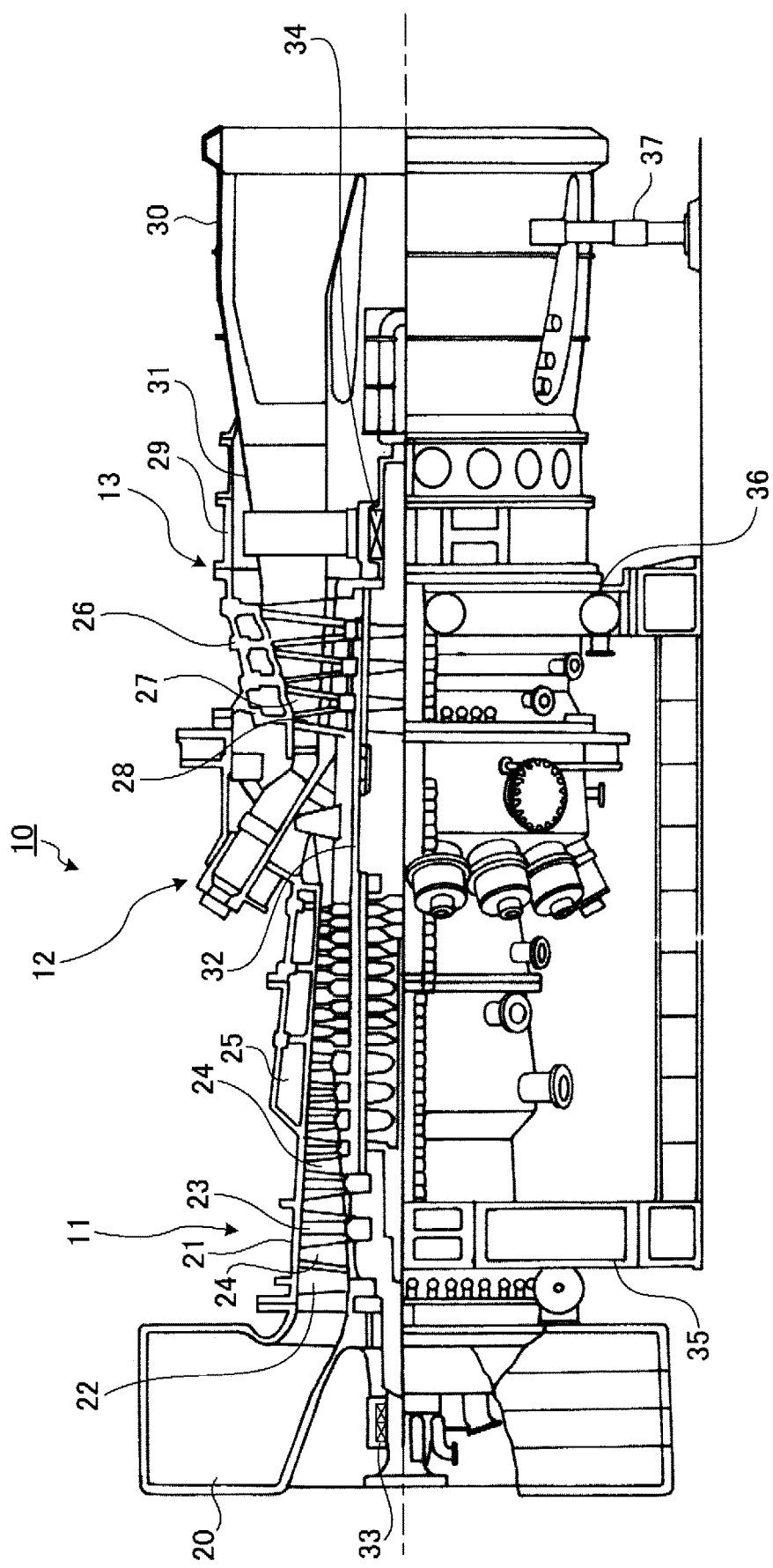
FIG. 6 is a schematic configuration view illustrating a gas turbine according to the first embodiment.
Figure 7:
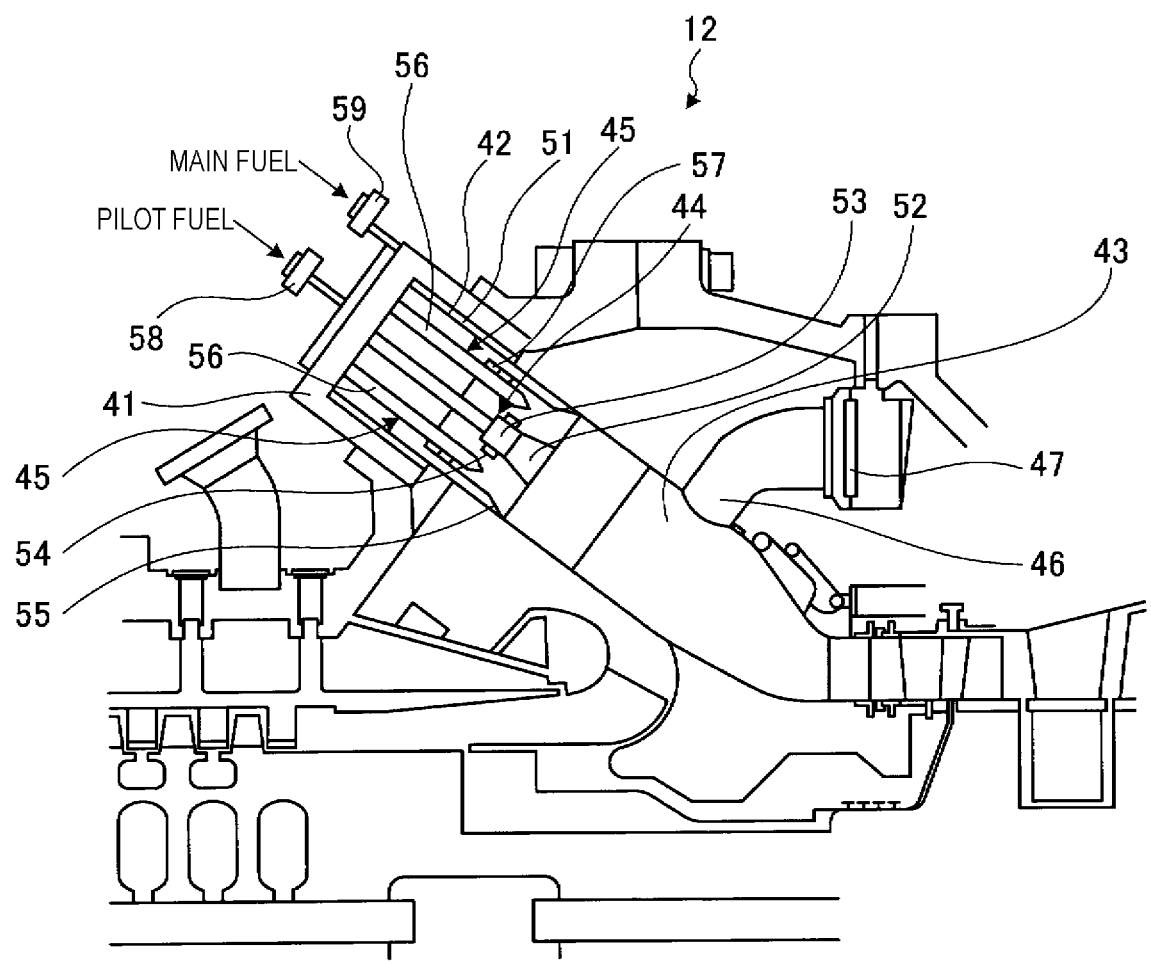
FIG. 7 is a schematic configuration view illustrating a gas turbine combustor according to the first embodiment.
Figure 8:
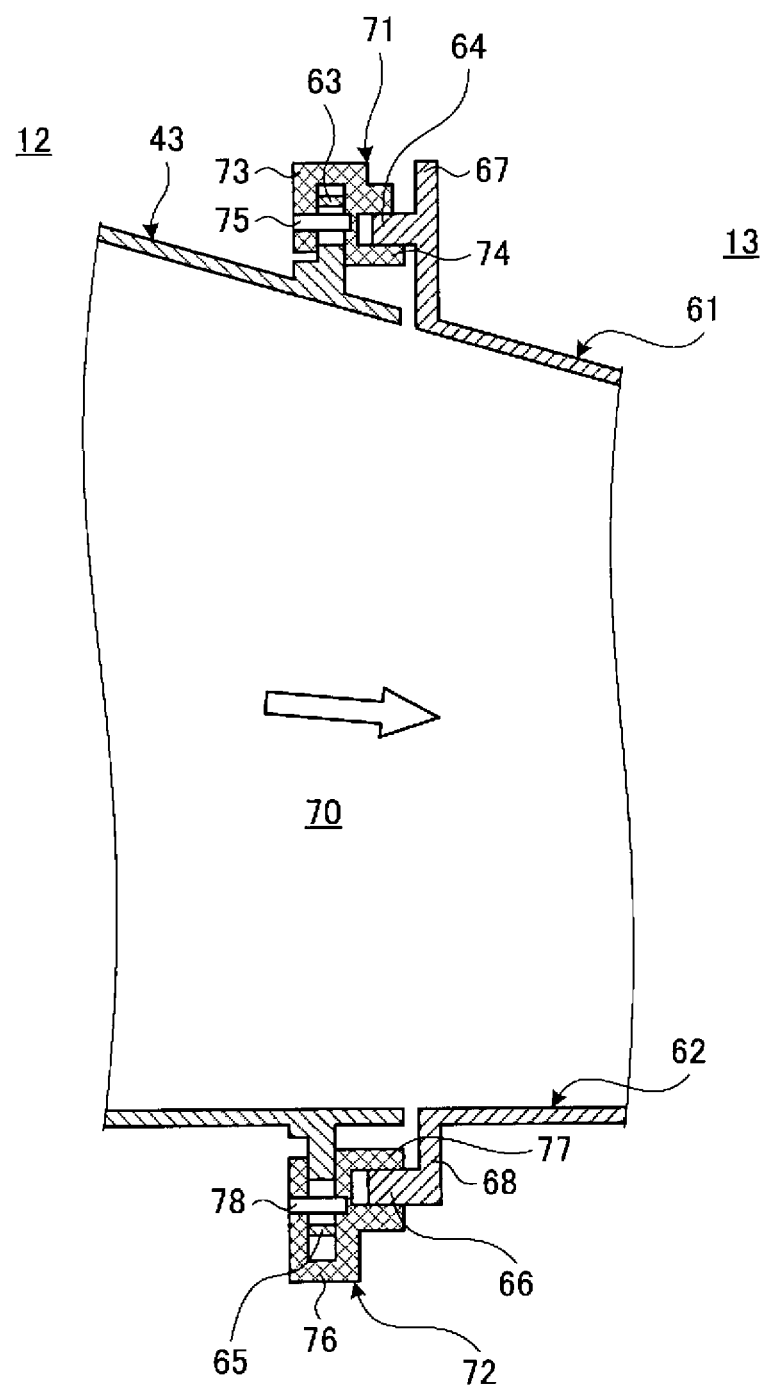
FIG. 8 is a cross sectional view illustrating a linking structure between a combustor transition piece and a shroud.

FIG. 6 is a schematic configuration view illustrating a gas turbine according to the first embodiment, FIG. 7 is a schematic configuration view illustrating a gas turbine combustor according to the first embodiment, and FIG. 8 is a cross sectional view illustrating a linking structure between a combustor transition piece and a shroud.

As illustrated in FIG. 6, a gas turbine 10 according to the first embodiment is configured of a compressor 11, a combustor 12, and a turbine 13. The gas turbine 10 is coaxially linked to a generator not illustrated in the drawings, and is capable of generating power.

The compressor 11 includes an air intake 20 for taking in air. An inlet guide vane (IGV) 22, and a plurality of vanes 23 and blades 24 alternately provided in a longitudinal direction (axial direction of a rotor 32 described below), are provided inside a compressor casing 21, while an air bleed chamber 25 is provided on an outside of the casing. The combustor 12 supplies fuel to compressed air compressed by the compressor 11, which fuel can be ignited and burned. Inside a turbine casing 26, the turbine 13 has a plurality of vanes 27 and blades 28 provided alternatively in a longitudinal direction (axial direction of the rotor 32 described below). An exhaust chamber 30 is provided through an exhaust casing 29 downstream of the turbine casing 26, and the exhaust chamber 30 has an exhaust diffuser 31 connected to the turbine 13.

Furthermore, a rotor (rotating shaft) 32 is positioned so as to penetrate the centers of the compressor 11, the combustor 12, the turbine 13, and the exhaust chamber 30. An end of the rotor 32 on the compressor 11 side is rotatably supported by a bearing part 33, while an end thereof on the exhaust chamber 30 side is rotatably supported by a bearing part 34. Furthermore, a plurality of discs to which the blades 24 are mounted are stacked and secured to the rotor 32 in the compressor 11, a plurality of discs to which the blades 28 are mounted are stacked and secured to the rotor in the turbine 13, while a drive shaft of the generator not illustrated in the figure is linked to the end of the rotor on the exhaust chamber 30 side.

Moreover, with regard to the gas turbine 10, the compressor casing 21 of the compressor 11 is supported by a leg part 35, the turbine casing 26 of the turbine 13 is supported by a leg part 36, and the exhaust chamber 30 is supported by a leg part 37.

Accordingly, air taken in from the air intake 20 of the compressor 11 passes through the IGV 22 and the plurality of vanes 23 and blades 24, and is compressed to thus become high-temperature, high-pressure compressed air. A predetermined fuel is supplied to the compressed air in the combustor 12 and burned. Furthermore, a high-temperature, high-pressure combustion gas, which is an operating fluid generated in the combustor 12, drives and rotates the rotor 32 by passing through the plurality of vanes 27 and blades 28 that configure the turbine 13, thus driving the generator linked to the rotor 32. Meanwhile, the combustion gas that drove the turbine 13 is discharged into the atmosphere as exhaust gas.

As illustrated in FIG. 7, in the combustor 12 described above, a combustor basket 42 is supported in a combustor external cylinder 41 with a predetermined clearance left therebetween, and a combustor transition piece (combustor pipe) 43 is linked to a tip part of the combustor basket 42 to thus configure a combustor casing. A pilot combustion burner 44 is provided positioned in a center of an interior of the combustor basket 42, and a plurality of main combustion burners 45 are provided on an inner circumferential surface of the combustor basket 42 so as to surround the pilot combustion burner 44 in the circumferential direction. Furthermore, a bypass tube 46 is linked to the combustor transition piece 43, and a bypass valve 47 is provided in this bypass tube 46.

To go into greater detail, by mounting a proximal end of the combustor basket 42 onto a proximal end of the combustor external cylinder 41, an air flow path 51 is formed between the two. Furthermore, the pilot combustion burner 44 is provided positioned in the center of the interior of the combustor basket 42, and the plurality of the main combustion burners 45 are provided on a circumference thereof.

The pilot combustion burner 44 is configured of a pilot cone 52 supported by the combustor basket 42, a pilot nozzle 53 provided inside the pilot cone 52, and a swirl vane 54 provided on an outer circumferential part of the pilot nozzle 53. Moreover, each of the main combustion burners 45 is configured of a burner pipe 55, a main nozzle 56 provided inside the burner pipe 55, and a swirl vane 57 provided on an outer circumferential part of the main nozzle 56.

Furthermore, in the combustor external cylinder 41, a pilot fuel line not illustrated in the figure is linked to a fuel port 58 of the pilot nozzle 53, and a main combustion line not illustrated in the figure is linked to a fuel port 59 of each of the main nozzles 56.

Accordingly, when an airflow of the high-temperature, high-pressure compressed air flows into the air flow path 51, the compressed air flows into the combustor basket 42, and the compressed air is mixed with fuel injected from the main combustion burner 45 in the combustor basket 42 to thus become a swirling flow of premixed gas. Furthermore, the compressed air is mixed with fuel injected from the pilot combustion burner 44, is ignited and burned by a pilot flame not illustrated in the figure, becomes combustion gas, and is then spewed into the combustor basket 42. Because part of the combustion gas is spewed into the combustor basket 42 so as to diffuse into the surroundings in conjunction with a flame therein, the premixed gas having flowed into the combustor basket 42 from each of the main combustion burners 45 is ignited and burned. That is, it is possible to sustain a flame for performing stable combustion of lean premixed fuel from the main combustion burner 45 using a diffusion flame created by the pilot fuel spewed from the pilot combustion burner 44.

As illustrated in FIG. 8, the combustor transition piece 43 of the combustor 12 and shrouds (turbine shrouds) 61 and 62 of the turbine 13 are linked through seal members 71 and 72. A plurality of the combustors 12 are provided in a ring shape along the circumferential direction, and each of the combustor transition pieces 43 is supported by the combustor external cylinder 41 (see FIG. 7). An outer shroud 61 and an inner shroud 62 form ring shapes and are supported by the turbine casing 26 (see FIG. 6). Because the seal members 71 and 72 are linked to a downstream end of the combustor transition piece 43 and upstream ends of the shrouds 61 and 62, outflow of the combustion gas is prevented.

Note that, unless noted otherwise, all descriptions of a radial direction, circumferential direction, inner circumferential side, and outer circumferential side are directions with respect to the gas turbine 10.

An outer circumferential-side seal member 71 is provided along the circumferential direction on an outside of the combustor transition piece 43 in the radial direction of the gas turbine, and has an upstream end thereof linked to an outer circumferential-side first flange part 63 of the combustor transition piece 43, and a downstream end thereof linked to an outer circumferential-side second flange part 64 of the outer shroud 61. An inner circumferential-side seal member 72 is provided along the circumferential direction on an inside (axis side) of the combustor transition piece 43 in the radial direction of the gas turbine, and has an upstream end thereof linked to an inner circumferential-side first flange part 65 of the combustor transition piece 43, and a downstream end thereof linked to an inner circumferential-side second flange part 66 of the inner shroud 62. Note that the combustor transition piece 43 is provided with a side seal (omitted from the figure) for partitioning combustor transition pieces 43 with adjacent downstream ends from one another.

The combustor transition piece 43 forms a rectangular cross section and is provided with the outer circumferential-side first flange part 63 extending outward in the radial direction from the outer circumferential side of a downstream end of the transition piece. The outer shroud 61 is provided with an attaching part 67 extending outward in the radial direction from an outer circumferential side of an upstream end of the shroud, and with the outer circumferential-side second flange part 64 extending upstream (combustor transition piece 43 side) from the attaching part 67. Meanwhile, the outer circumferential-side seal member 71 is provided with an outer circumferential-side first fitting part 73 open to the inner circumferential side on the upstream end of the member, and with an outer circumferential-side second fitting part 74 open downstream (outer shroud 61 side) on the downstream end of the member.

Furthermore, because the outer circumferential-side first flange part 63 of the combustor transition piece 43 fits into the outer circumferential-side first fitting part 73 of the outer circumferential-side seal member 71, and a linking pin 75 penetrates the outer circumferential-side first flange part 63 and the outer circumferential-side seal member 71, the combustor transition piece 43 and the outer circumferential-side seal member 71 are linked. Moreover, because the outer circumferential-side second flange part 64 of the outer shroud 61 fits into the outer circumferential-side second fitting part 74 of the outer circumferential-side seal member 71, the outer circumferential-side seal member 71 and the outer shroud 61 are linked.

Additionally, the combustor transition piece 43 is provided with the inner circumferential-side first flange part 65 extending inward (axis side) in the radial direction from the inner circumferential side of the downstream end of the transition piece. The inner shroud 62 is provided with an attaching part 68 extending inward in the radial direction from the inner circumferential side (axis side) of an upstream end of the shroud, and with the inner circumferential-side second flange part 66 extending upstream (the combustor transition piece 43 side) from the attaching part 68. Meanwhile, the inner circumferential-side seal member 72 is provided with an inner circumferential-side first fitting part 76 open to the outer circumferential side on the upstream end of the member, and with an inner circumferential-side second fitting part 77 open downstream (the inner shroud 62 side) on the downstream end of the member.

Furthermore, because the inner circumferential-side first flange part 65 of the combustor transition piece 43 fits into the inner circumferential-side first fitting part 76 of the inner circumferential-side seal member 72, and a linking pin 78 penetrates the inner circumferential-side first flange part 65 and the inner circumferential-side seal member 72, the combustor transition piece 43 and the inner circumferential-side seal member 72 are linked. Moreover, because the inner circumferential-side second flange part 66 of the inner shroud 62 fits into the inner circumferential-side second fitting part 77 of the inner circumferential-side seal member 72, the inner circumferential-side seal member 72 and the inner shroud 62 are linked.

Linking the combustor transition piece 43 and the shrouds 61 and 62 through the seal members 71 and 72 in this way provides a combustion gas flow path 70, and prevents the combustion gas flowing through the combustion gas flow path 70 from leaking.

Thus, in the combustor transition piece 43, in a state where the outer circumferential-side first flange part 63 has been fitted into the outer circumferential-side first fitting part 73 of the outer circumferential-side seal member 71, the outer circumferential-side seal member 71 is linked by the linking pin 75 penetrating therethrough. Furthermore, in the combustor transition piece 43, in a state where the inner circumferential-side first flange part 65 has been fitted into the inner circumferential-side first fitting part 76 of the inner circumferential-side seal member 72, the inner circumferential-side seal member 72 is linked by the linking pin 78 penetrating therethrough. Therefore, there is a risk that restraint on the seal members 71 and 72 in the circumferential direction will be lost during operation of the gas turbine, causing the seal members 71 and 72 to shift in the circumferential direction thus making it impossible to prevent a combustion gas leak. Therefore, the first embodiment provides a structure for suppressing the displacement of the seal members 71 and 72 in the circumferential direction.

Figure 1:
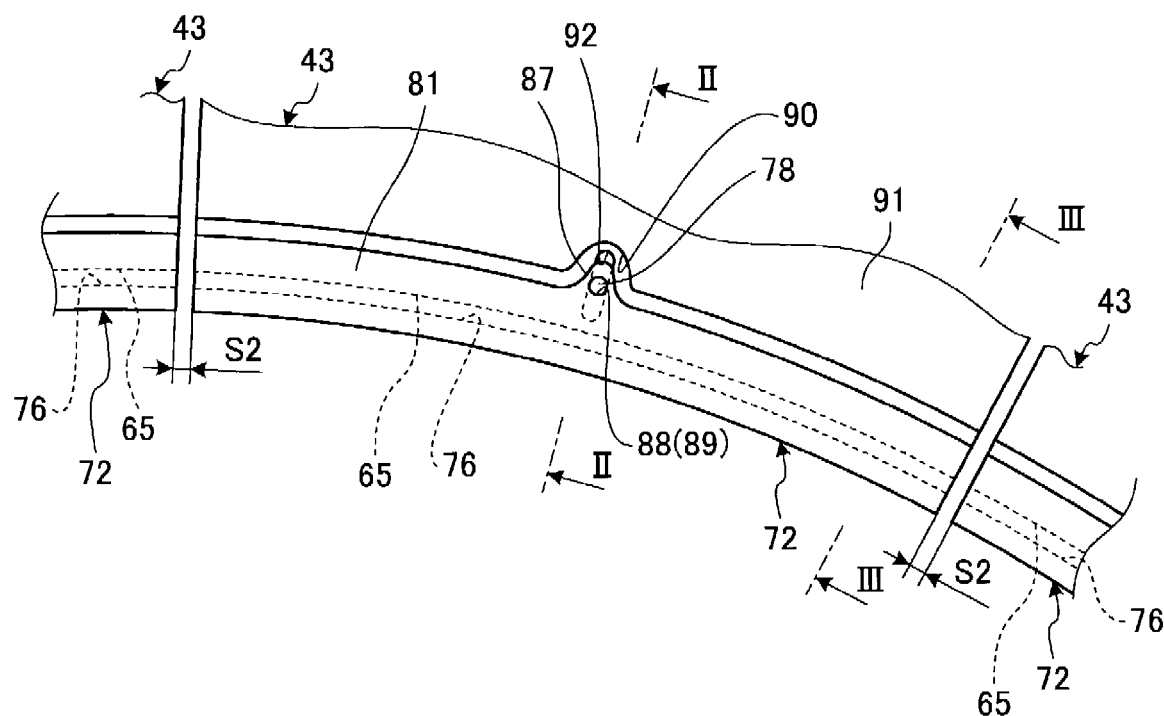
FIG. 1 is an elevation view of a seal member illustrating a seal member assembly structure according to a first embodiment.
Figure 4:
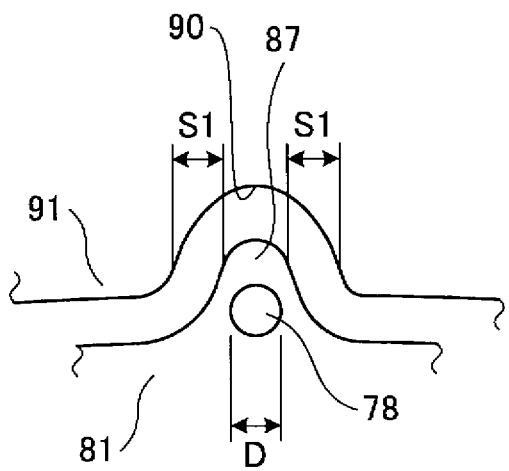
FIG. 4 is a descriptive view illustrating a relationship between a protruding part and a recessed part.
Figure 5:
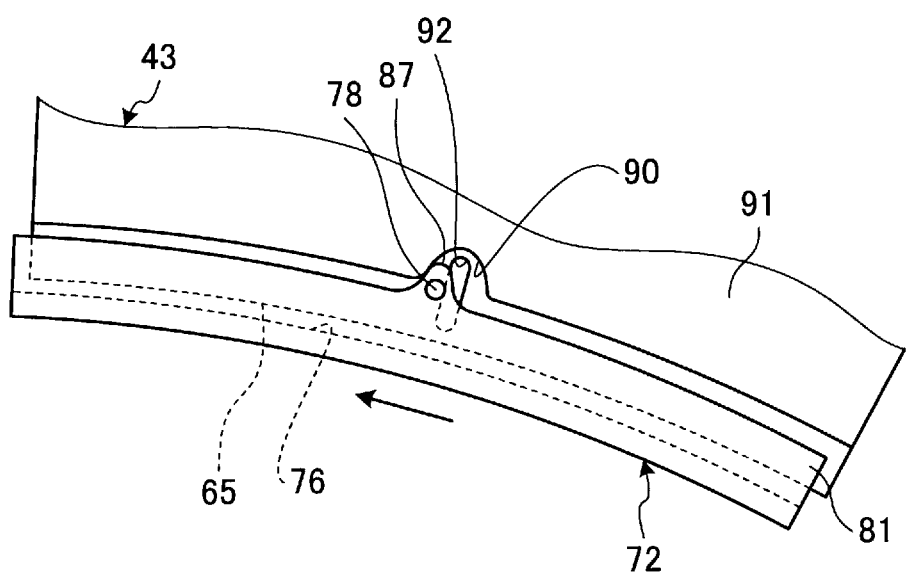
FIG. 5 is an elevation view of the seal member illustrating movement of the seal member during breaking of a linking pin.

While the seal members 71 and 72 will be described in detail below, the inner circumferential-side seal member 72 is described here. FIG. 1 is an elevation view of the seal member illustrating a seal member assembly structure according to a first embodiment, FIG. 2 is a cross sectional view along II-II in FIG. 1, FIG. 3 is a cross sectional view along III-III in FIG. 1, FIG. 4 is a descriptive view illustrating a relationship between a protruding part and a recessed part, and FIG. 5 is an elevation view of the seal member illustrating movement of the seal member during breaking of the linking pin.

Figure 2:
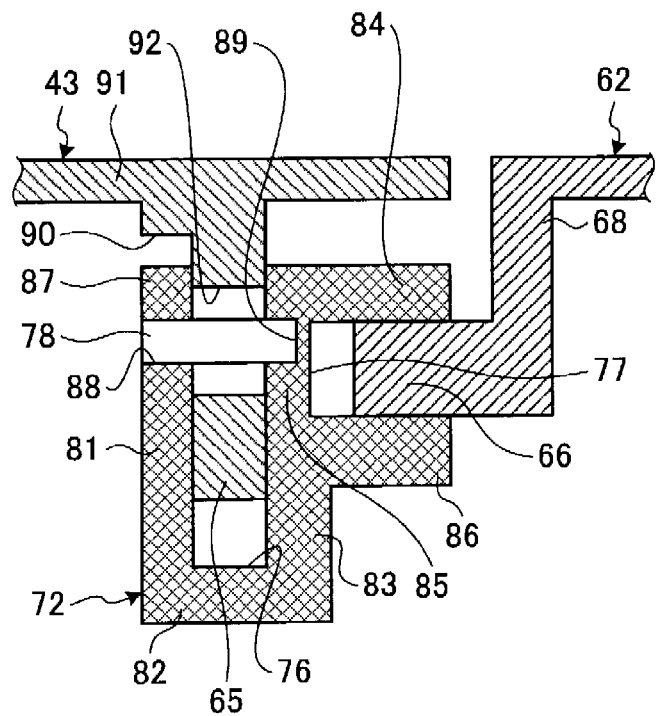
FIG. 2 is a cross sectional view along II-II in FIG. 1.
Figure 3:
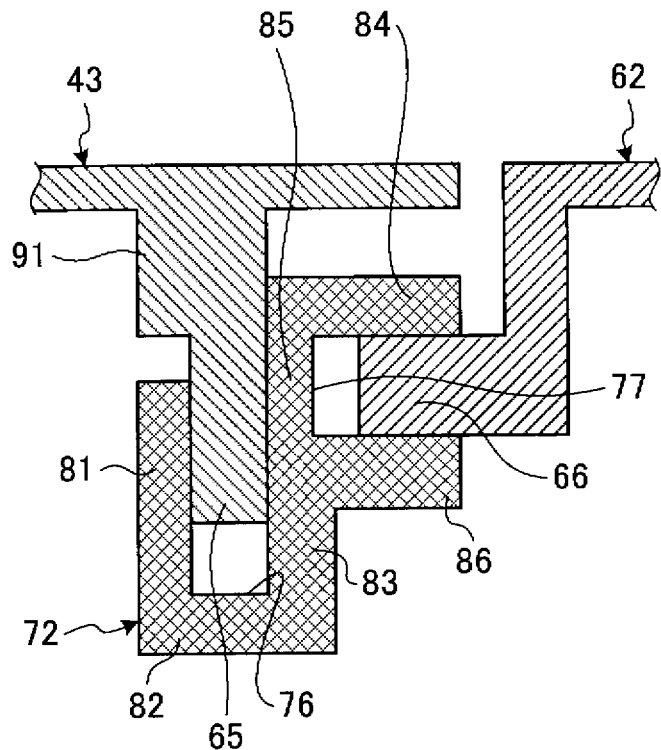
FIG. 3 is a cross sectional view along III-III in FIG. 1.

As illustrated in FIG. 1 through FIG. 3, the combustor transition piece 43 is provided with the inner circumferential-side first flange part 65 extending inward in the radial direction from an inner circumferential part of the downstream end of the transition piece. The inner circumferential-side seal member 72 is provided along an inner circumferential part of the combustor transition piece 43, and the inner circumferential-side first fitting part 76 created by three fitting walls 81, 82, and 83 is provided on the upstream end of the member, and the inner circumferential-side second fitting part 77 created by three fitting walls 84, 85, and 86 is provided on the downstream end of the member.

Furthermore, the inner circumferential-side seal member 72 is provided with a protruding part (locking part) 87 protruding outward in the radial direction of the gas turbine in a middle part in the longitudinal direction. The protruding part 87 is provided protruding outward from an end surface of the fitting wall 81, and a round through hole 88 penetrating the fitting wall 81 in the axial direction is formed in the fitting wall 81 at a position corresponding to the protruding part 87, and a round attaching hole 89 that does not penetrate the fitting wall 83 in the axial direction is formed in the fitting wall 83. Meanwhile, the combustor transition piece 43 is provided with a recessed part (locking part) 90 recessed outward in the radial direction of the gas turbine in a middle part of an inner circumferential side in the circumferential direction. The recessed part 90 is formed by partially notching a block body 91 protruding upstream from a flat part in the inner circumferential-side first flange part 65, and a long hole 92 penetrating in the axial direction that is long in the radial direction of the combustor transition piece 43 is formed in the inner circumferential-side first flange part 65.

Furthermore, because the inner circumferential-side first flange part 65 of the combustor transition piece 43 fits into the inner circumferential-side first fitting part 76 of the inner circumferential-side seal member 72, and the linking pin 78 penetrates the through hole 88 and the long hole 92 and fits in and is crimped in the attaching hole 89, the combustor transition piece 43 and the inner circumferential-side seal member 72 are linked. At this time, the protruding part 87 of the inner circumferential-side seal member 72 is inserted into the recessed part 90 of the combustor transition piece 43 and thus overlaps therewith in the radial direction, and the protruding part 87 and the recessed part 90 are provided with a gap along the circumferential direction of the combustor transition piece 43. That is, the protruding part 87 protrudes from an end surface of the fitting wall 81 so as to form a curved surface, and the recessed part 90 is formed by notching an end surface of the block body 91 of the combustor transition piece 43 so as to form a curved surface. Therefore, surfaces of the protruding part 87 and the recessed part 90 that face each other are formed by curved surfaces.

At this time, because the inner circumferential-side first flange part 65 fits into the inner circumferential-side first fitting part 76, the inner circumferential-side seal member 72 is unable to move with respect to the combustor transition piece 43 in the axial direction thereof, and because the linking pin 78 penetrates the inner circumferential-side first flange part 65 and the inner circumferential-side first fitting part 76, the inner circumferential-side seal member 72 is unable to move with respect to the combustor transition piece 43 in the circumferential direction thereof. However, because the linking pin 78 penetrates the long hole 92 of the inner circumferential-side first flange part 65, the inner circumferential-side seal member 72 is capable of a predetermined amount of relative movement in the radial direction with respect to the combustor transition piece 43, and is able to rotate around the linking pin 78 at a predetermined angle. This allows a thermal expansion difference between the combustor transition piece 43 and the inner circumferential-side seal member 72 to be absorbed.

Furthermore, because the inner circumferential-side second flange part 66 fits into the inner circumferential-side second fitting part 77, the inner circumferential-side seal member 72 is unable to move in the radial direction relative to the inner shroud 62. A thermal expansion difference between the combustor transition piece 43 and the inner shroud 62 can also be absorbed in this case by the long hole 92 of the inner circumferential-side first flange part 65.

The seal member assembly method according to the first embodiment will be described next. The seal member assembly method according to the first embodiment is a method for attaching a second seal member provided along the circumferential direction of the combustor transition piece 43 between the combustor transition piece 43 and the inner shroud 62, and has a step of fitting the inner circumferential-side first flange part 65 of the combustor transition piece 43 into the inner circumferential-side first fitting part 76 of the inner circumferential-side seal member 72, a step of inserting the protruding part 87 provided on the inner circumferential-side first fitting part 76 side of the inner circumferential-side seal member 72 into the recessed part 90 provided on the inner circumferential-side first flange part 65 side of the combustor transition piece 43, a step of securing the inner circumferential-side first flange part 65 and the inner circumferential-side first fitting part 76 by the linking pin 78 penetrating therethrough, and a step of fitting the inner circumferential-side second flange part 66 of the inner shroud 62 into the inner circumferential-side second fitting part 77 of the inner circumferential-side seal member 72.

As illustrated in FIG. 1 and FIG. 4, when the inner circumferential-side seal member 72 is assembled between the combustor transition piece 43 and the inner shroud 62 in this way, a gap is secured between an end surface of the fitting wall 81 on which the protruding part 87 is formed and an end surface of the block body 91 in which the recessed part 90 is formed, and thus an operating gap S1 in the circumferential direction of the combustor transition piece 43 is secured between the protruding part 87 and the recessed part 90. Furthermore, because a plurality of the combustor transition pieces 43 are provided side by side in the circumferential direction, a gap S2 is secured between adjacent combustor transition pieces 43, that is, between adjacent inner circumferential-side seal members 72. Moreover, the operating gap S1 is set smaller than the gap S2 (S1<S2). Note that the relationship between the operating gap S1 and the gap S2 is not limited to this size relationship. For example, a plurality of the linking pins 78 penetrating the seal members 72 adjacent to one another in the circumferential direction may break during operation. At such times, gravity may cause a plurality of the seal members 72 to move in the circumferential direction and thus displace them from suitable seal positions. In such cases, while the relationship S1<S2 is not maintained, sealing performance can be ensured as long as the recess or the protrusion of the seal member 71 is positioned in a middle part in the longitudinal direction.

Furthermore, the combustor transition piece 43, the inner circumferential-side seal member 72, and the like must be replaced at predetermined intervals, which requires the combustor transition piece 43 and the inner circumferential-side seal member 72 to be removed. In such cases, the combustor transition piece 43 and the inner circumferential-side seal member 72 are disassembled by breaking the linking pins 78. Specifically, applying stress in the longitudinal direction (the circumferential direction of the combustor transition piece 43) to the inner circumferential-side seal member 72 applies shear force to the linking pins 78 that breaks the pins and thus disassembles the combustor transition piece 43 and the inner circumferential-side seal member 72. Therefore, the operating gap S1 is set larger than the outer diameter D of the linking pins 78 (S1>D). Note that the relationship between the operating gap S1 and the outer diameters D of the linking pins 78 is also not limited to this size relationship.

The operation of the seal member assembly structure according to the first embodiment will be described next.

As illustrated in FIG. 1, when the combustor transition piece 43, the inner circumferential-side seal member 72, and the inner shroud 62 are assembled together, the combustor transition piece 43 and the inner circumferential-side seal member 72 are assembled in predetermined positions, and the protruding part 87 and the recessed part 90 do not make contact. The gas turbine is operated in this state. As illustrated in FIG. 5, the inner circumferential-side seal member 72 tries to shift in the circumferential direction with respect to the combustor transition piece 43 and the inner shroud 62 during operation of the gas turbine. However, as soon as the inner circumferential-side seal member 72 moves the amount of the operating gap S1 with respect to the combustor transition piece 43 and the inner shroud 62, the protruding part 87 and the recessed part 90 abut (make contact) to thus restrict the circumferential shift of the inner circumferential-side seal member 72. As a result, displacement of the inner circumferential-side seal member 72 is prevented.

Furthermore, when the combustor transition piece 43, the inner circumferential-side seal member 72, and the inner shroud 62 are to be disassembled, as illustrated in FIG. 1, first, stress in the circumferential direction is applied to the inner circumferential-side seal member 72, and thereby shear force is applied to break the linking pins 78. Next, the inner shroud 62 is moved downstream and the combustor transition piece 43 and the inner circumferential-side seal member 72 are moved upstream so as to pull out the inner circumferential-side second flange part 66 of the inner shroud 62 from the inner circumferential-side second fitting part 77 of the inner circumferential-side seal member 72, and thus the inner shroud 62 and the inner circumferential-side seal member 72 are disassembled. Furthermore, an upstream side of the inner circumferential-side seal member 72 is moved inward in the radial direction with respect to the combustor transition piece 43 so as to pull out the inner circumferential-side first flange part 65 from the inner circumferential-side first fitting part 76 and pull out the protruding part 87 from the recessed part 90, and thus the combustor transition piece 43 and the inner circumferential-side seal member 72 are disassembled.

Note that the assembly structure, assembly method, removal method, and the like, for the combustor transition piece 43, the inner circumferential-side seal member 72, and the inner shroud 62 described in the preceding description, are the same as the assembly structure and the assembly method for the combustor transition piece 43, the outer circumferential-side seal member 71, and the outer shroud 61. That is, the outer circumferential-side first fitting part 73 of the outer circumferential-side seal member 71 is provided with a protruding part, a recessed part is provided in the outer circumferential-side first flange part 63 of the combustor transition piece 43, and these are assembled so that the protruding part of the outer circumferential-side first fitting part 73 is inserted into the recessed part of the outer circumferential-side first flange part 63.

Figure 9:
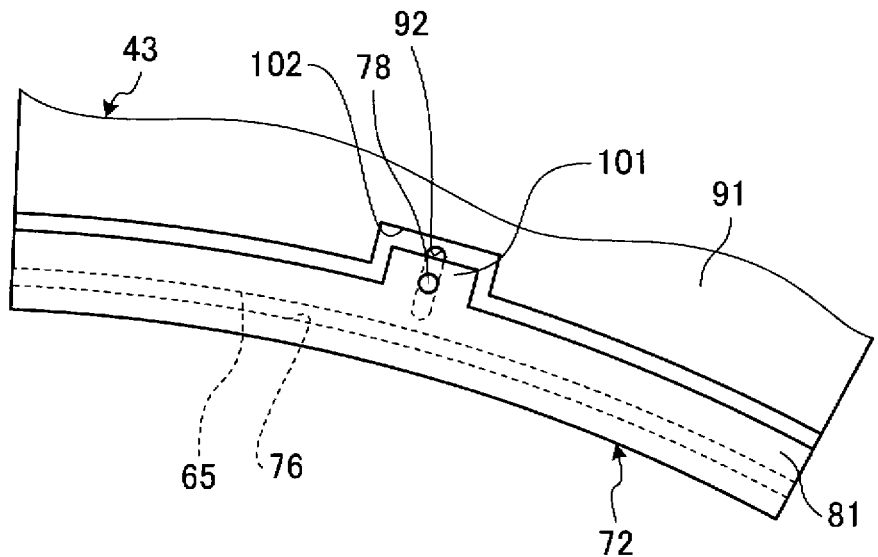
FIG. 9 is an elevation view of a seal member illustrating a modified embodiment of the seal member assembly structure.
Figure 10:
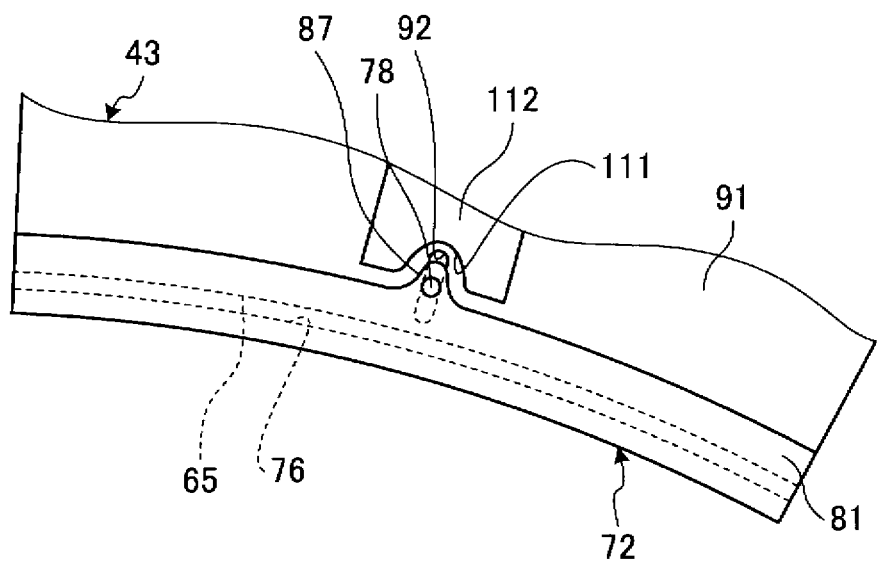
FIG. 10 is an elevation view of a seal member illustrating a modified embodiment of the seal member assembly structure.
Figure 11:
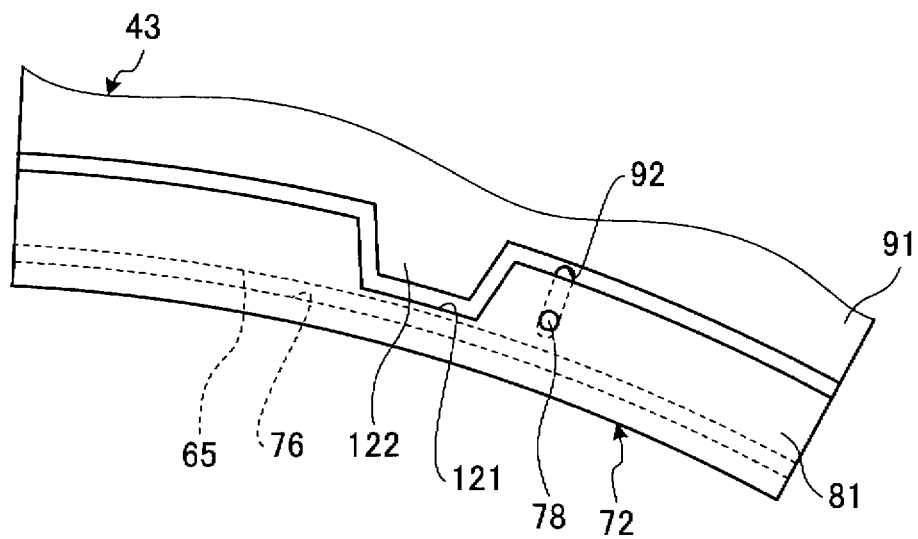
FIG. 11 is an elevation view of a seal member illustrating a modified embodiment of the seal member assembly structure.

Furthermore, while the surfaces of the protruding part 87 and the recessed part 90 facing each other are formed by curved surfaces in the embodiment described above, the parts are not limited to this configuration. FIG. 9 through FIG. 11 are elevation views of a seal member illustrating modified embodiments of the seal member assembly structure.

As illustrated in FIG. 9, in modified embodiment 1 of the first embodiment, the inner circumferential-side seal member 72 is provided with a protruding part (locking part) 101 protruding outward in the radial direction of the gas turbine in a middle part in the longitudinal direction. The protruding part 101 protrudes outward from an end surface of the fitting wall 81, and is provided forming a rectangular shape. Meanwhile, the combustor transition piece 43 is provided with a recessed part (locking part) 102 recessed outward in the radial direction of the gas turbine in a middle part of the inner circumferential side in the circumferential direction. The recessed part 102 is formed by partially notching the block body 91 protruding upstream from the flat part in the inner circumferential-side first flange part 65, and is formed in a rectangular shape. Furthermore, because the inner circumferential-side first flange part 65 of the combustor transition piece 43 fits into the inner circumferential-side first fitting part 76 of the inner circumferential-side seal member 72 and is secured by the linking pin 78 penetrating therethrough, the combustor transition piece 43 and the inner circumferential-side seal member 72 are linked. At this time, the protruding part 101 of the inner circumferential-side seal member 72 is inserted into the recessed part 102 of the combustor transition piece 43 and thus overlaps therewith in the radial direction, and the protruding part 101 and the recessed part 102 are provided with a gap along the circumferential direction of the combustor transition piece 43.

Note that while the protruding part 101 and the recessed part 102 are described as being rectangular here, said parts are not limited to this shape and thus may have polygonal shapes, such as triangles, squares, or trapezoids, may be semicircular or elliptical, or may have shapes combining rectangles and circles.

Furthermore, as illustrated in FIG. 10, in modified embodiment 2 of the first embodiment, the inner circumferential-side seal member 72 is provided with the protruding part 87 protruding outward in the radial direction of the gas turbine in a middle part in the longitudinal direction. The protruding part 87 is provided protruding outward from the end surface of the fitting wall 81. Meanwhile, the combustor transition piece 43 is provided with a recessed part (locking part) 111 recessed outward in the radial direction of the gas turbine in a middle part of the inner circumferential side in the circumferential direction. The recessed part 111 is formed by partially notching a block body 112 protruding upstream from the flat part in the inner circumferential-side first flange part 65. In this case, the block body 112 need not be provided across the entire flat part in the inner circumferential-side first flange part 65, but providing the body only in a portion in the longitudinal direction, that is, in a position facing the protruding part 87, is sufficient.

Furthermore, because the inner circumferential-side first flange part 65 of the combustor transition piece 43 fits into the inner circumferential-side first fitting part 76 of the inner circumferential-side seal member 72 and is secured by the linking pin 78 penetrating therethrough, the combustor transition piece 43 and the inner circumferential-side seal member 72 are linked. At this time, the protruding part 87 of the inner circumferential-side seal member 72 is inserted into the recessed part 111 of the combustor transition piece 43 and thus overlaps therewith in the radial direction, and the protruding part 87 and the recessed part 111 are provided with a gap along the circumferential direction of the combustor transition piece 43.

Furthermore, as illustrated in FIG. 11, in modified embodiment 3 of the first embodiment, the inner circumferential-side seal member 72 is provided with a recessed part (locking part) 121 recessed inward in the radial direction of the gas turbine in a middle part in the longitudinal direction. The recessed part 121 is formed by partially notching the end surface of the fitting wall 81. Meanwhile, the combustor transition piece 43 is provided with a protruding part (locking part) 122 protruding inward the radial direction of the gas turbine in a middle part of the inner circumferential side in the circumferential direction. The protruding part 122 is provided protruding inward from the block body 91 protruding upstream from the flat part in the inner circumferential-side first flange part 65.

Furthermore, because the inner circumferential-side first flange part 65 of the combustor transition piece 43 fits into the inner circumferential-side first fitting part 76 of the inner circumferential-side seal member 72 and is secured by the linking pin 78 penetrating therethrough in a position shifted in the circumferential direction from the recessed part 121 and the protruding part 122, the combustor transition piece 43 and the inner circumferential-side seal member 72 are linked. At this time, the protruding part 122 of the combustor transition piece 43 is inserted into the recessed part 121 of the inner circumferential-side seal member 72 and thus overlaps therewith in the radial direction, and the recessed part 121 and the protruding part 122 are provided with a gap along the circumferential direction of the combustor transition piece 43.

As described above, with the seal member assembly structure according to the first embodiment, because the first flange parts 63 and 65 provided on the combustor transition piece 43 fit into the first fitting parts 73 and 76 provided in the seal members 71 and 72, and the linking pins 75 and 78 penetrate the first flange parts 63 and 65 and the first fitting parts 73 and 76, the seal members 71 and 72 are linked to the combustor transition piece 43, and the protruding parts 87 provided on the first fitting parts 73 and 76 are inserted into the recessed parts 90 provided in the first flange parts 63 and 65.

Accordingly, even though the seal members 71 and 72 try to shift in the circumferential direction with respect to the combustor transition piece 43, the shift of the seal members 71 and 72 is restricted because the protruding part 87 and the recessed part 90 make contact. As a result, because the displacement of the seal members 71 and 72 is prevented, a combustion gas leak can be prevented over a long period of time, and reliability can be enhanced.

With the seal member assembly structure according to the first embodiment, the protruding part 87 protrudes outward in the radial direction of the combustor transition piece 43, and the recessed part 90 is recessed outward in the radial direction of the combustor transition piece 43. Accordingly, the shift of the seal members 71 and 72 is easily restricted because the protruding part 87 and the recessed part 90 make contact.

With the seal member assembly structure according to the first embodiment, the operating gap S1 is provided along the circumferential direction of the combustor transition piece 43 between the protruding part 87 and the recessed part 90. Accordingly, when the combustor transition piece 43 and the seal members 71 and 72 are to be disassembled, a shear force in the amount of the operating gap S1 can be applied to break the linking pins 75 and 78, which thus enables enhancement of maintainability.

With the seal member assembly structure according to the first embodiment, the surfaces of the protruding part 87 and the recessed part 90 that face each other are formed by curved surfaces. Accordingly, wear occurring when the protruding part 87 and the recessed part 90 make contact can be reduced.

With the seal member assembly structure according to the first embodiment, the first flange parts 63 and 65 fit into the first fitting parts 73 and 76 such that none of them are capable of relative movement in the axial direction of the combustor transition piece 43, and the linking pins 75 and 78 penetrate the first flange parts 63 and 65 and the first fitting parts 73 and 76 such that none of them are capable of relative movement in the circumferential direction of the combustor transition piece 43. Accordingly, the seal members 71 and 72 can be properly positioned with respect to the combustor transition piece 43.

With the seal member assembly structure according to the first embodiment, because the second flange parts 64 and 66 provided on the shrouds 61 and 62 fit into the second fitting parts 74 and 77, the seal members 71 and 72 are mutually incapable of relative movement in the radial direction of the shrouds 61 and 62. Accordingly, the seal members 71 and 72 can be properly positioned with respect to the shrouds 61 and 62.

Furthermore, the seal member assembly method according to the first embodiment has the step of fitting the first flange parts 63 and 65 of the combustor transition piece 43 into the first fitting parts 73 and 76 of the seal members 71 and 72, the step of inserting the protruding parts 87 provided on the first fitting parts 73 and 76 into the recessed parts 90 provided in the first flange parts 63 and 65, and the step of securing the first flange parts 63 and 65 and the first fitting parts 73 and 76 by the linking pins 75 and 78 penetrating therethrough. Accordingly, even though the seal members 71 and 72 try to shift in the circumferential direction with respect to the combustor transition piece 43, the shift of the seal members 71 and 72 is restricted because the protruding part 87 and the recessed part 90 make contact. As a result, because the displacement of the seal members 71 and 72 is prevented, a combustion gas leak can be prevented over a long period of time, and reliability can be enhanced.

Furthermore, the seal member according to the first embodiment is provided with the first fitting parts 73 and 76 into which the first flange parts 63 and 65 provided on the combustor transition piece 43 fit, the through-holes 88 through which the linking pins 75 and 78 for linking the first fitting parts 73 and 76 to the first flange parts 63 and 65 penetrate, and the protruding parts (locking parts) 87 for preventing movement of the first fitting parts 73 and 76 with respect to the first flange parts 63 and 65 along the circumferential direction of the combustor transition piece 43. Accordingly, even though the seal members 71 and 72 try to shift in the circumferential direction with respect to the combustor transition piece 43, the shift of the seal members 71 and 72 is restricted because the protruding part 87 and the recessed part 90 make contact. As a result, because the displacement of the seal members 71 and 72 is prevented, a combustion gas leak can be prevented over a long period of time, and reliability can be enhanced.

Furthermore, the gas turbine according to the first embodiment is provided with the compressor 11, the combustor 12, and the turbine 13. Accordingly, because the displacement of the seal members 71 and 72 is prevented, a combustion gas leak can be prevented over a long period of time, and reliability can be enhanced.

Second Embodiment

Figure 12:
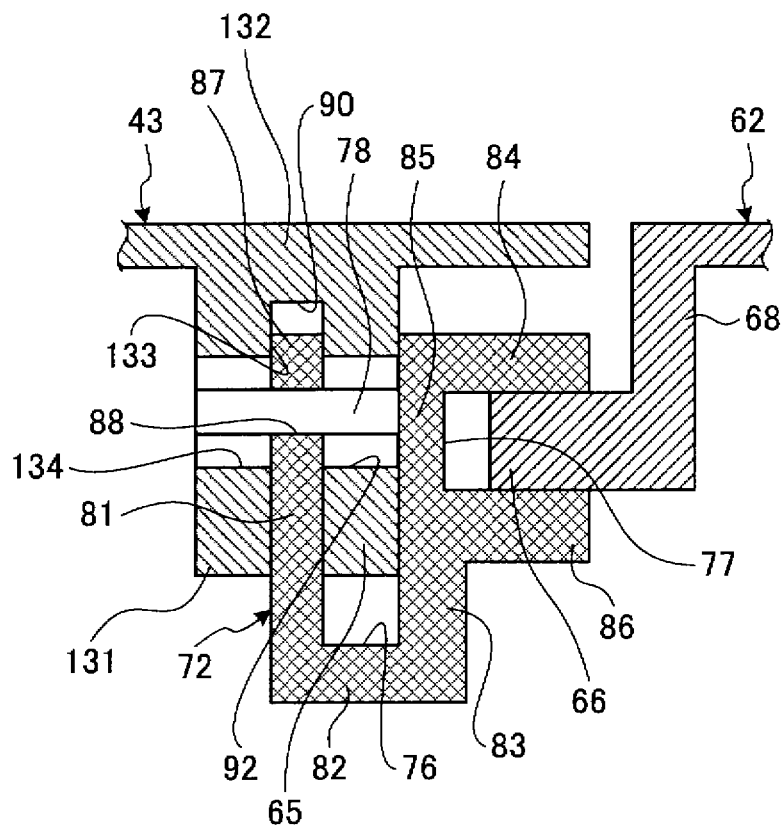
FIG. 12 is a cross sectional view of a seal member illustrating a seal member assembly structure according to a second embodiment.

FIG. 12 is a cross sectional view of a seal member illustrating a seal member assembly structure according to a second embodiment. Note that the same reference numbers are attached to members having the same functions as in the embodiment described above, and detailed descriptions of said members are omitted.

As illustrated in FIG. 12, in the seal member assembly structure according to the second embodiment, the combustor transition piece 43 is provided with the inner circumferential-side first flange part 65 extending inward in the radial direction. The combustor transition piece 43 is also provided with an inner circumferential-side third fitting part 133 created by the inner circumferential-side first flange part 65 and two fitting walls 131 and 132. Meanwhile, the inner circumferential-side seal member 72 is provided with the inner circumferential-side first fitting part 76 created by the three fitting walls 81, 82, and 83 on the upstream end of the member, and the inner circumferential-side second fitting part 77 created by the three fitting walls 84, 85, and 86 is provided on the downstream end of the member.

Furthermore, the inner circumferential-side seal member 72 is provided with the protruding part 87 protruding outward in the radial direction of the gas turbine in a middle part in the longitudinal direction. The protruding part 87 is provided protruding outward from the end surface of the fitting wall 81. Meanwhile, the combustor transition piece 43 is provided with the recessed part (locking part) 90 recessed outward in the radial direction of the gas turbine in a middle part of the inner circumferential side in the circumferential direction. The recessed part 90 is formed by partially notching the fitting wall 132 protruding upstream from the flat part in the inner circumferential-side first flange part 65, and long holes 134 and 92 that penetrate the fitting wall 131 and the inner circumferential-side first flange part 65 in the axial direction and that are long in the radial direction of the combustor transition piece 43 are formed in the fitting wall 131 and the inner circumferential-side first flange part 65.

Furthermore, because the inner circumferential-side first flange part 65 of the combustor transition piece 43 fits into the inner circumferential-side first fitting part 76 of the inner circumferential-side seal member 72, and the fitting wall 81 of the inner circumferential-side seal member 72 fits into the inner circumferential-side third fitting part 133 of the combustor transition piece 43, and the inner circumferential-side first flange part 65 and the fitting wall 81 are secured by the linking pin 78 penetrating the long hole 134, the through hole 88, and the long hole 92, the combustor transition piece 43 and the inner circumferential-side seal member 72 are linked. At this time, the protruding part 87 of the inner circumferential-side seal member 72 is inserted into the recessed part 90 of the combustor transition piece 43 and thus overlaps therewith in the radial direction, and the protruding part 87 and the recessed part 90 are provided with a gap along the circumferential direction of the combustor transition piece 43.

As described above, with the seal member assembly structure according to the second embodiment, because the inner circumferential-side first flange part 65 of the combustor transition piece 43 fits into the inner circumferential-side first fitting part 76 of the inner circumferential-side seal member 72, and the fitting wall 81 of the inner circumferential-side seal member 72 fits into the inner circumferential-side third fitting part 133 of the combustor transition piece 43, and these are secured by the linking pin 78, the combustor transition piece 43 and the inner circumferential-side seal member 72 are linked. Accordingly, linking rigidity between the combustor transition piece 43 and the inner circumferential-side seal member 72 can be enhanced.

Third Embodiment

Figure 13:
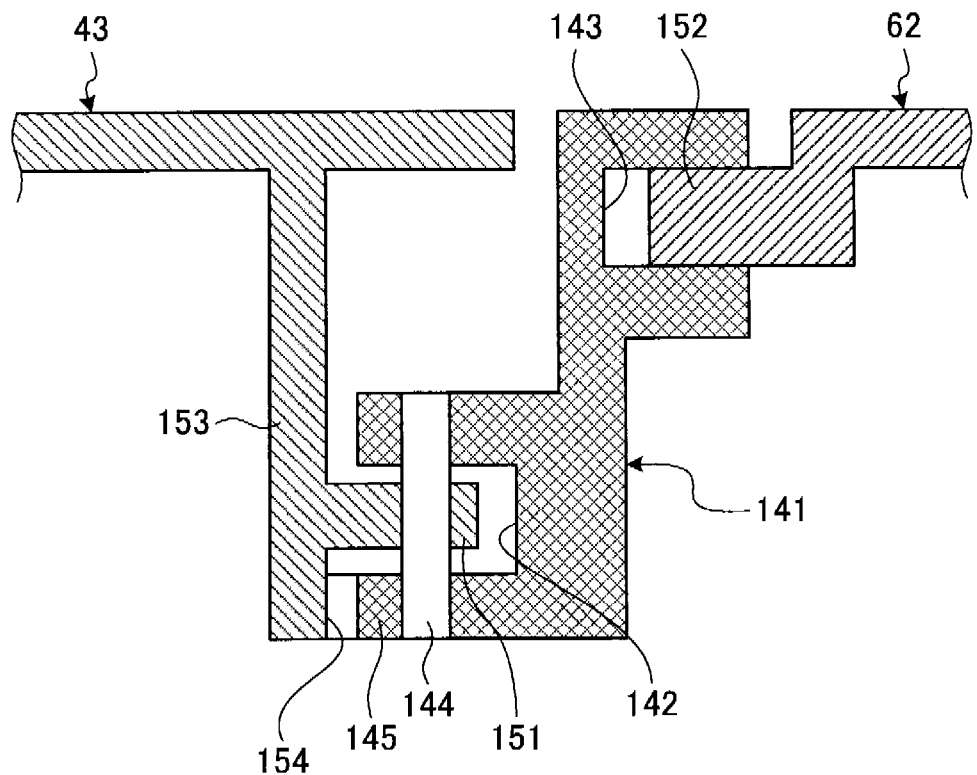
FIG. 13 is a cross sectional view of a seal member illustrating a seal member assembly structure according to a third embodiment.

FIG. 13 is a cross sectional view of a seal member illustrating a seal member assembly structure according to a third embodiment. Note that the same reference numbers are attached to members having the same functions as in the embodiments described above, and detailed descriptions of said members are omitted.

As illustrated in FIG. 13, in the seal member assembly structure according to the third embodiment, the combustor transition piece 43 and the inner shroud 62 are linked through an inner circumferential-side seal member 141. Because the inner circumferential-side seal member 141 is linked to a downstream end of the combustor transition piece 43 and an upstream end of the shroud 62, the combustion gas is prevented from outflowing.

The inner circumferential-side seal member 141 is provided along the circumferential direction on the inside (axis side) of the transition piece 43 in the radial direction of the gas turbine, and has an upstream end thereof linked to an inner circumferential-side first flange part 151 of the combustor transition piece 43, and a downstream end thereof linked to an inner circumferential-side second flange part 152 of the inner shroud 62. The combustor transition piece 43 is provided with an attaching part 153 extending inward (axis side) in the radial direction from the inner circumferential side of the downstream end of the transition piece, and with the inner circumferential-side first flange part 151 extending downstream (the inner shroud 62 side) from the attaching part 153. The inner shroud 62 is provided with the inner circumferential-side second flange part 152 extending upstream (the combustor transition piece 43 side) from the inner circumferential side (axis side) of the upstream end of the shroud. Meanwhile, the inner circumferential-side seal member 141 is provided with an inner circumferential-side first fitting part 142 open upstream (the combustor transition piece 43 side) on the upstream end of the member, and with an inner circumferential-side second fitting part 143 open downstream (the inner shroud 62 side) on the downstream end of the member.

Furthermore, because the inner circumferential-side first flange part 151 of the combustor transition piece 43 fits into the inner circumferential-side first fitting part 142 of the inner circumferential-side seal member 141, and a linking pin 144 penetrates the inner circumferential-side first flange part 151 and the inner circumferential-side seal member 141 along the radial direction, the combustor transition piece 43 and the inner circumferential-side seal member 141 are linked. Moreover, because the inner circumferential-side second flange part 152 of the inner shroud 62 fits into the inner circumferential-side second fitting part 143 of the inner circumferential-side seal member 141, the inner circumferential-side seal member 141 and the inner shroud 62 are linked. In this case, because a radial gap is secured between the inner circumferential-side first flange part 151 and the inner circumferential-side first fitting part 142, a thermal expansion difference between the combustor transition piece 43 and the inner circumferential-side seal member 141 can be absorbed.

Furthermore, the inner circumferential-side seal member 141 is provided with a protruding part (locking part) 145 protruding upstream of the inner circumferential-side first fitting part 142. Meanwhile, the combustor transition piece 43 is provided with a recessed part (locking part) 154 recessed upstream at a tip of the attaching part 153. Moreover, because the inner circumferential-side first flange part 151 of the combustor transition piece 43 fits into the inner circumferential-side first fitting part 142 of the inner circumferential-side seal member 141 and is secured by the linking pin 144 penetrating therethrough, the combustor transition piece 43 and the inner circumferential-side seal member 141 are linked. At this time, the protruding part 145 of the inner circumferential-side seal member 141 is inserted into the recessed part 154 of the combustor transition piece 43 and thus overlaps therewith in the radial direction, and the protruding part 145 and the recessed part 154 are provided with a gap along the circumferential direction of the combustor transition piece 43.

As described above, according to the seal member assembly structure according to the third embodiment, because the inner circumferential-side first flange part 151 provided on the combustor transition piece 43 fits into the inner circumferential-side first fitting part 142 provided in the inner circumferential-side seal member 141, and the linking pin 144 penetrates the inner circumferential-side first flange part 151 and the inner circumferential-side first fitting part 142, the inner circumferential-side seal member 141 is linked to the combustor transition piece 43, and the protruding part 145 provided on the inner circumferential-side first fitting part 142 is inserted into the recessed part 154 provided in the attaching part 153.

Accordingly, even though the inner circumferential-side seal member 141 tries to shift in the circumferential direction with respect to the combustor transition piece 43, the shift of the inner circumferential-side seal member 141 is restricted because the protruding part 145 and the recessed part 154 make contact. As a result, because the displacement of the inner circumferential-side seal member 141 is prevented, a combustion gas leak can be prevented for a long period of time, and reliability can be enhanced.

Note that with the embodiments described above, because the outer circumferential-side first flange part 63 of the combustor transition piece 43 fits into the outer circumferential-side first fitting part 73 of the outer circumferential-side seal member 71, and the linking pin 75 penetrates the outer circumferential-side first flange part 63 and the outer circumferential-side seal member 71, the combustor transition piece 43 and the outer circumferential-side seal member 71 are linked. Furthermore, because the inner circumferential-side first flange part 65 of the combustor transition piece 43 fits into the inner circumferential-side first fitting part 76 of the inner circumferential-side seal member 72, and the linking pin 78 penetrates the inner circumferential-side first flange part 65 and the inner circumferential-side seal member 72, the combustor transition piece 43 and the inner circumferential-side seal member 72 are linked. However, the present invention is not limited to this configuration.

That is, the linking pins 75 and 78 can be omitted. The outer circumferential-side seal member 71 is held in position because the outer circumferential-side first fitting part 73 fits on the outer circumferential-side first flange part 63 of the combustor transition piece 43, and the outer circumferential-side second flange part 64 of the outer shroud 61 fits into the outer circumferential-side second fitting part 74 of the outer circumferential-side seal member 71. Furthermore, the inner circumferential-side seal member 72 is held in position because the inner circumferential-side first fitting part 76 fits on the inner circumferential-side first flange part 65 of the combustor transition piece 43, and the inner circumferential-side second flange part 66 of the inner shroud 62 fits into the inner circumferential-side second fitting part 77.

Moreover, in the embodiments described above, the first flange parts 63 and 65 provided on the combustor transition piece 43 are fitted into and secured to the first fitting parts 73 and 76 provided in the seal members 71 and 72, and the protruding part 87 is provided on the first fitting parts 73 and 76, and the recessed part 90 is provided in the first flange parts 63 and 65; however, the embodiments are not limited to this configuration. For example, the second flange parts 64 and 66 provided on the shrouds 61 and 62 may be fitted into and secured to the second fitting parts 74 and 77 provided in the seal members 71 and 72, and the protruding part may be provided on either the second fitting parts 74 and 77 or the second flange parts 64 and 66 while the recessed part may be provided in the other.

Furthermore, with the embodiments described above, the protruding part 87 protrudes outward in the radial direction of the combustor transition piece 43, and the recessed part 90 is recessed outward in the radial direction of the combustor transition piece 43; however, the embodiments are not limited to this configuration. For example, the protruding part may protrude in the axial direction of the combustor transition piece 43, and the recessed part may be recessed in the axial direction of the combustor transition piece 43. That is, the protruding part and the recessed part may be provided in positions such that the parts make contact when displaced in the circumferential direction.

REFERENCE NUMERALS

11 Compressor
12 Combustor (gas turbine combustor)
13 Turbine
41 Combustor external cylinder
42 Combustor basket
43 Combustor transition piece (pipe)
61 Outer shroud
62 Inner shroud
63 Outer circumferential-side first flange part
64 Outer circumferential-side second flange part
65, 151 Inner circumferential-side first flange part
66, 152 Inner circumferential-side second flange part
70 Combustion gas flow path
71 Outer circumferential-side seal member
72, 141 Inner circumferential-side seal member
73 Outer circumferential-side first fitting part
74 Outer circumferential-side second fitting part
75, 78, 144 Linking pin
76, 142 Inner circumferential-side first fitting part
77, 143 Inner circumferential-side second fitting part
87, 101, 122, 145 Protruding part (locking part)
90, 102, 111, 121, 154 Recessed part (locking part)

The invention claimed is:

1. A gas turbine comprising an assembly structure of a seal member provided along a circumferential direction of the gas turbine between a combustor pipe and a turbine shroud, wherein:
a first flange part provided on the combustor pipe is positioned within a first fitting part provided in the seal member;
a linking pin penetrates the first flange part and the first fitting part to link the seal member to the combustor pipe;
a protruding part is provided on one of the first flange part or the first fitting part;
a recessed part is provided in the other of the first flange part or the first fitting part;
the protruding part is positioned within the recessed part;
the protruding part and the recessed part are configured to prevent the first fitting part from moving with respect to the first flange part along the circumferential direction of the gas turbine;
the first fitting part is provided on an upstream end of the seal member and includes a first fitting wall, a second fitting wall, and a third fitting wall, the first fitting wall being upstream from the second fitting wall and the third fitting wall; and either:
the protruding part protrudes from a radial end face of the first fitting wall; or
the recessed part is recessed into the radial end face of the first fitting wall.

2. The gas turbine according to claim 1, wherein the protruding part protrudes in a radial direction of the gas turbine, and the recessed part is recessed in the radial direction of the gas turbine.

3. The gas turbine according to claim 2, wherein:
the recessed part is defined by a notch in a block body protruding upstream from a flat part of the first flange part.

4. The gas turbine according to claim 1, wherein the protruding part and the recessed part are positioned with a gap between the protruding part and the recessed part along the circumferential direction of the gas turbine.

5. The gas turbine according to claim 1, wherein a surface of the protruding part and a surface of the recessed part face each other and are curved.

6. The gas turbine according to claim 1, wherein the first flange part fits into the first fitting part such that neither the first flange part nor the first fitting part is capable of relative movement in an axial direction of the gas turbine, and the linking pin penetrates the first flange part and the first fitting part such that neither the first flange part nor the first fitting part is capable of relative movement in the circumferential direction of the gas turbine.

7. The gas turbine according to claim 1, wherein the seal member is provided with a second fitting part, and a second flange part provided on the turbine shroud fits into the second fitting part such that neither the second flange part nor the second fitting part is capable of relative movement in a radial direction of the gas turbine.

8. A gas turbine assembly method, wherein the gas turbine comprises:
an assembly structure of a seal member provided along a circumferential direction of the gas turbine between a combustor pipe and a turbine shroud, wherein:
a first flange part provided on the combustor pipe is positioned within a first fitting part provided in the seal member;
a linking pin penetrates the first flange part and the first fitting part to link the seal member to the combustor pipe;
a protruding part is provided on one of the first flange part or the first fitting part;
a recessed part is provided in the other of the first flange part or the first fitting part;
the protruding part is positioned within the recessed part;
the protruding part and the recessed part are configured to prevent the first fitting part from moving with respect to the first flange part along the circumferential direction of the gas turbine;
the first fitting part is provided on an upstream end of the seal member and includes a first fitting wall, a second fitting wall, and a third fitting wall, the first fitting wall being upstream from the second fitting wall and the third fitting wall; and either:
the protruding part protrudes from a radial end face of the first fitting wall; or
the recessed part is recessed into the radial end face of the first fitting wall;
the assembly method comprising:
fitting the first flange part into the first fitting part;
inserting the protruding part into the recessed part; and
securing the first flange part and the first fitting part by the linking pin.

* * * * *